United States Patent
Hong et al.

(10) Patent No.: US 6,822,700 B2
(45) Date of Patent: Nov. 23, 2004

(54) LIQUID CRYSTAL DISPLAY DEVICE HAVING STAIRS TYPE DRIVING SIGNAL

(75) Inventors: Seung Ho Hong, Kyoungki-do (KR); Seung Hee Lee, Kyoungki-do (KR)

(73) Assignee: Boe-Hydis Technology Co., Ltd., Kyoungki-do (KR)

(*) Notice: Subject to any disclaimer, the term of this patent is extended or adjusted under 35 U.S.C. 154(b) by 18 days.

(21) Appl. No.: 10/157,516

(22) Filed: May 29, 2002

(65) Prior Publication Data

US 2002/0180905 A1 Dec. 5, 2002

(30) Foreign Application Priority Data

May 30, 2001 (KR) .......................................... 2001-30129

(51) Int. Cl.[7] .............................................. G02F 1/133
(52) U.S. Cl. .............................. 349/33; 345/94; 345/95; 345/96
(58) Field of Search .......................... 349/33, 99, 175, 349/176, 185; 345/94, 95, 96

(56) References Cited

U.S. PATENT DOCUMENTS

| | | | | |
|---|---|---|---|---|
| 5,597,626 A | * | 1/1997 | Eguchi | ...................... 428/1.4 |
| 6,005,646 A | * | 12/1999 | Nakamura et al. | ............. 349/33 |
| 6,015,507 A | * | 1/2000 | Kobayashi et al. | .... 252/299.01 |
| 6,040,890 A | * | 3/2000 | Sawada et al. | ............. 349/182 |
| 6,549,185 B1 | * | 4/2003 | Hatano | ........................ 345/94 |
| 6,583,778 B1 | * | 6/2003 | Nishimura et al. | ........... 345/96 |
| 6,621,476 B2 | * | 9/2003 | Walton et al. | ................ 345/87 |

* cited by examiner

*Primary Examiner*—Tarifur R. Chowdhury
*Assistant Examiner*—Michael H. Caley
(74) *Attorney, Agent, or Firm*—Ladas & Parry LLP

(57) ABSTRACT

Liquid crystal display devices having stairs type driving signal capable of preventing over-twist and improving response time properties by applying data signal of stairs type pulse signal when a gate signal is applied to drive the TFT, including upper and lower substrates with an interposed liquid crystal layer driving electrodes to drive the liquid crystals; first and second alignment layers rubbed in a first direction and in a direction parallel with the first alignment layer, respectively; first polarizing plate arranged outside of the lower substrate, forming 45° angle with the first direction; and second polarizing plate outside of the upper substrate having a transmittance axis perpendicular to the first polarizing plate and forming 45° angle with the first direction. A gate signal is applied to drive a thin film transistor in each pixel, and data signals having two or more stairs type pulse signals are successively applied.

8 Claims, 8 Drawing Sheets ive signal which can eliminate over-transmittance due to voltage application and have rapid response time by successively applying data signals having different size when a gate pulse is applied.

LIQUID CRYSTAL DISPLAY DEVICE HAVING STAIRS TYPE DRIVING SIGNAL

BACKGROUND OF THE INVENTION

The present invention relates to a liquid crystal display device applying Twist OCB mode, and, more particularly, to a liquid crystal display device having stairs type driving signal which can eliminate over-transmittance due to voltage application and have rapid response time by successively applying data signals having different size when a gate pulse is applied.

Generally, liquid crystal display devices have a structure that liquid crystal molecules are aligned between a pair of transparent substrates. In the structure, screen display is performed by transmitting or cutting off light for electrically controlling the alignment state of liquid crystal molecules. The liquid crystal display device has been used as an indicator of electronic calculators and digital watches and at the same time, rapidly extended its application to a screen of laptop computer, television receiver and word processor.

The conventional liquid crystal display has generally employed TN mode which has improved optical properties, clear B/W display and rapid response time. As shown in FIG. 1, the TN mode liquid crystal display device comprises an upper and a lower substrates 1, 5, a pixel electrode 2 arranged on the inner side of lower substrate 1, a common electrode 6 arranged on the inner side of upper substrate 5, alignment layers (not shown) respectively arranged on the opposite surfaces of upper and lower substrates, polarizing plates 4,7 on the outer sides of upper and lower substrates 1,5 and a liquid crystal layer 8 interposed between upper and lower substrates 1,5, including a plurality of liquid crystal molecules.

The alignment layer (not shown) is a horizontal alignment layer wherein a rubbing axis 3b thereof is crossed by 90° and upper and lower polarizing plates and polarizing axes 4a, 7a are attached in a crossed direction. That is, the rubbing axis 2a of lower alignment layer and the polarizing axis 4a of lower polarizing plate are attached in the same direction, and the rubbing axis 3b of upper alignment layer and the polarizing axis 7a of upper polarizing plate are attached in the same direction. And, the pixel electrode 2 and the common electrode 6 are formed in a plate shape.

As shown in FIG. 1, liquid crystal molecules 8 are levorotatorily twisted by 90° under the influence of upper and lower alignment layers and chiral dopant before the electric field is applied to the region between the pixel electrode 2 and the common electrode 6. Therefore, after passing through the lower polarizing plate 4, light can pass through levorotatorily twisted liquid crystal molecules 8a, and then the upper polarizing plate 7. As a result, the screen becomes white.

Although it is not shown in the drawings, when the electric filed is applied to the region between the pixel electrode 2 and the common electrode 6, the liquid crystal molecules 8a are arranged to be parallel with the electric field (perpendicular to the substrate) formed between driving electrodes. Therefore, after passing through the lower polarizing plate 4, light cannot pass through the crossed upper polarizing plate since the major axis of liquid crystal molecules 8a is perpendicular to the surface of substrate. As a result, the screen becomes dark.

However, the TN liquid crystal display device has different refractive anisotropies according to the direction since the interposed liquid crystal molecules have a shape of bar. Thus, transmittance is drastically diversified according to the viewing angle and therefore, the liquid crystal display has disadvantages that it is difficult to apply to large scale display and the response time is too slow to realize moving pictures. As a result, it has difficulty in being applied to large scale TV due to its narrow viewing angle and slow response time.

In order to solve the problems, various liquid crystal modes have been proposed. However, they have not completely satisfied wide viewing angle and at the same time, high speed response time. Recently, OCB (Optically Compensated Bend) mode has been proposed to have a wide viewing angle by a phase compensation film and at the same time, a high speed response time below 10 ms. The OCB is a mode using bend of liquid crystals generated when the upper and lower substrates are rubbed to be parallel with each other and a predetermined voltage is applied.

The OCB mode liquid crystal display (Reference: SID 93 Digest P277, "Wide-Viewing-Angle Display Mode for the Active-Matrix LCD Using Bend-Alignment Liquid Crystal Cell, Y. Yamaguchi, T. Miyashita, T. Uchida) can compensate refractive anisotropy of liquid crystal molecules without several times of rubbing processes, thereby maintaining regular viewing angle in any direction of screen.

FIGS. 2A to 2C are drawings showing a conventional OCB mode liquid crystal display device.

Referring to FIG. 2A, a lower substrate 10 and an upper substrate 15 are arranged opposite to each other with a predetermined distance. A liquid crystal layer 18 is interposed between the lower substrate 10 and the upper substrate 15. The liquid crystal layer includes a plurality of liquid crystal molecules 18a, made of materials having positive dielectric anisotropy. And, driving electrodes 11,16 are arranged on the inner sides of lower and the upper substrates 10,15 to drive liquid crystal molecules, wherein a first alignment layer 12 is disposed on the inner side of lower substrate 10, that is, between the lower substrate 10 and the liquid crystal layer 19 and a second alignment layer 17 is disposed on the inner side of upper substrate 15, that is, between the upper substrate 15 and the liquid crystal layer 19. The first and the second alignment layers 12,17 are horizontal alignment layers having a pretilt angle of below 10°, rubbed to the direction parallel with each other. Furthermore, polarizing plates 19a,19b are attached on the outer sides of lower and upper substrates 10,15, having a predetermined of polarizing axes. It is desirable that the polarizing axes of the polarizing plates 19a,19b are cross-arranged with each other.

As shown in FIG. 2A, when the voltage is not applied to the OCB mode liquid crystal display device, liquid crystal molecules 18a are arranged in a shape of splay under the influence of first and second alignment layers 12,17.

As shown in FIG. 2B, when the voltage is applied between the driving electrodes to the critical voltage Vs, that is, as much as liquid crystal molecules 18a in the middle layer of the liquid crystal layer 18 are affected by electric field, the liquid crystal molecules 19a in the middle layer are twisted by the effect of electric field E1, so that the electric field and the major axis thereof are parallel with each other. However, the liquid crystal molecules 19a arranged on upper and lower parts are affected by alignment layers 12,17 than by electric field, thereby maintaining the initial alignment. Here, it is possible to control $d\Delta n$ of liquid crystals to make white state.

Thereafter, as shown in FIG. 2C, when the voltage greater than the critical voltage Vs is applied between driving electrodes, liquid crystal molecules are affected by electric field E2 in the middle layer and the vicinities thereof. Therefore, they are twisted so that the electric field and the major axis thereof are parallel with each other, thereby screen becomes dark. The liquid crystal molecules 19a adjacent to the surface of substrates 10,15 are affected by alignment layers 12,17 than by electric field, thereby maintaining the initial alignment.

In the OCB mode liquid crystal display device, liquid crystal molecules 19a are arranged symmetrically with respect to the middle layer when the electric field is formed. Therefore, it is possible to accomplish phase compensation when light passes through the upper substrate 15 from the lower substrate 10. And, when the electric field is not formed, backflow is not generated, having a rapid response time.

According to the conventional OCB mode liquid crystal display, when the electric field is not formed, liquid crystal molecules are arranged horizontally with substrate surface and spacers are distributed to maintain cell gap. Here, liquid crystal molecules around spacers are arranged along the surface of spacer, not maintaining horizontal alignment. As a result, liquid crystal molecules are arranged unstably in the region where spacers are distributed.

And, driving electrodes 11,16 are formed in a pattern type, having a predetermined topology. Therefore, on the upper part of pixel electrode 11 or counter electrode, the major axis of liquid crystal molecules forms parallel with the surface of horizontal alignment layer 12 by the influence of the horizontal alignment layer 12. However, in the topology of pixel electrode 11, the major axis of liquid crystal molecules forms parallel with the surface of topology, thereby generating reverse tilt.

As described above, the alignment of liquid crystal molecules is partially unstable and reverse tilt is generated in the topology, thereby deteriorating screen qualities.

In order to solve the problems, COCB (Chiral Optical Compensated Bend) mode has been proposed, wherein chiral dopants are added to the liquid crystal in order to accomplish stable twist in the range of a predetermined d/p (cell gap/pitch) before voltage application or at one initial voltage application, thereby overcoming problems of normal OCB mode. FIG. 3 shows the range of applied voltage according to d/n in the COCB mode.

However, as shown in FIG. 3, when voltage is applied to obtain desirable transmittance, the transmittance is increased not promptly but through another transmittance. Therefore, in the conventional COCB mode liquid crystal display device, when small voltage is applied, the response time is increased.

SUMMARY OF THE INVENTION

Therefore, an object of the present invention is to provide a liquid crystal display device having stairs type driving signal capable of preventing over twist of liquid crystals and improving response time properties by applying stairs type pulse signal when a gate signal is applied to drive TFT.

In order to accomplish the above object, the present invention comprises:

an upper and a lower substrates arranged opposite to each other with a predetermined distance;

a liquid crystal layer interposed between the upper and lower substrates, comprising liquid crystals having refractive anisotropy;

a first and a second driving electrodes arranged on the inner sides of upper and lower substrates to drive the liquid crystal;

a first alignment layer interposed between the lower substrate and the liquid crystal layer, rubbed to a first direction;

a second alignment layer interposed between the upper substrate and the liquid crystal layer, rubbed to the direction parallel with the first alignment layer;

a first polarizing plate arranged on the outer side of lower substrate, forming an angle of 45° with the first direction; and a second polarizing plate arranged on the outer side of upper substrate, transmission axis thereof being perpendicular to the first polarizing plate and forming an angle of 45° with the first direction, and when a gate signal is applied to drive thin film transistors in each pixel, data signals having two or more stairs type pulse signals are successively applied.

The amount of dopants is controlled to maintain cell gap (d)/pitch of liquid crystal (p) at 0.1~0.8, desirably 0.26~0.36 according to the cell gap (d). Therefore, although they are arranged in splay or in a mixture of splay and twist before voltage application, it is possible to maintain 180° twisted state after twisted by applying a predetermined voltage.

The d/p is controlled at 0.36~0.8 to maintain stable twist before voltage application.

The refractive anisotropy of liquid crystal is approximately $\Delta n=0.06~0.18$, the cell gap (d) is 3~20 $\mu$m and d$\Delta$n is 0.18~3.6 $\mu$m.

In the liquid crystals, dielectric anisotropy is approximately $\Delta\epsilon=2~20$ to lower driving voltage.

The liquid crystals have a phase retardation of approximately d$\Delta$n=0.02~1.5 $\mu$m at the front thereof and refractive anisotropy perpendicular or horizontal to rubbing axis of the first direction, thereby becoming dark state at a desired voltage.

The liquid crystal has a pretilt angle of 0~40°.

The stairs type pulse signal has two or more voltage levels.

DETAILED DESCRIPTION OF THE INVENTION

Figure 1:
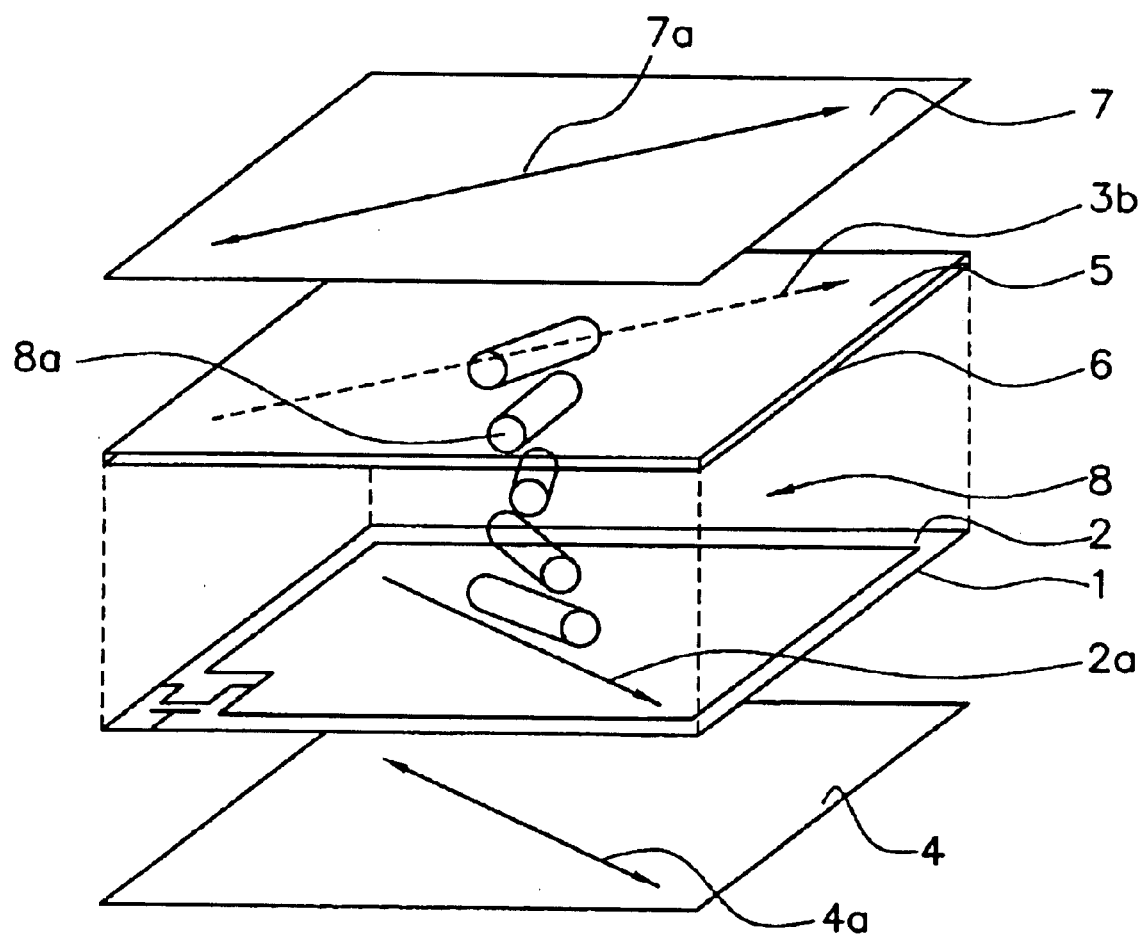
FIG. 1 is an exploded perspective view of a conventional twisted nematic liquid crystal display device.
Figure 2A:
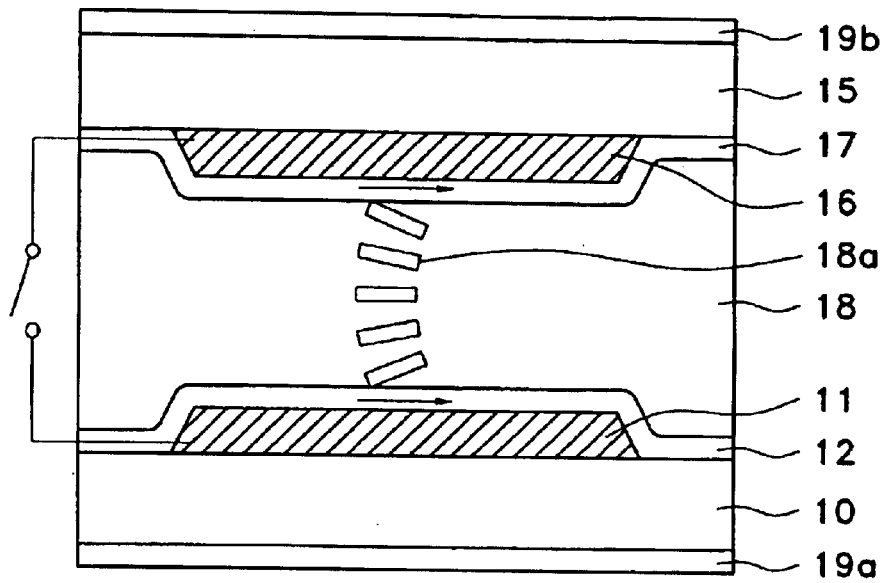
FIGS. 2A to 2C are cross sectional views showing a conventional OCB mode liquid crystal display device.
Figure 2B:
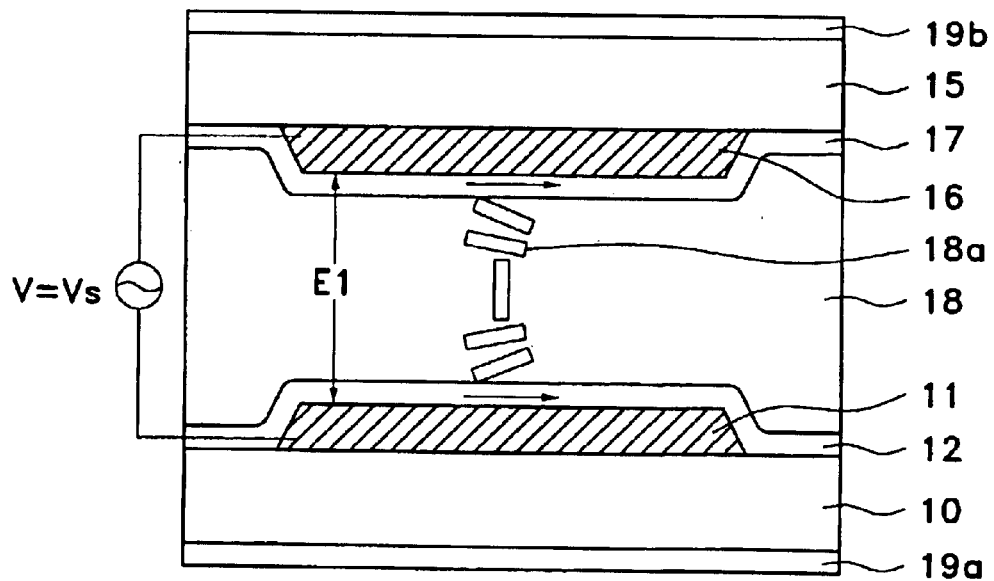
Figure 2C:
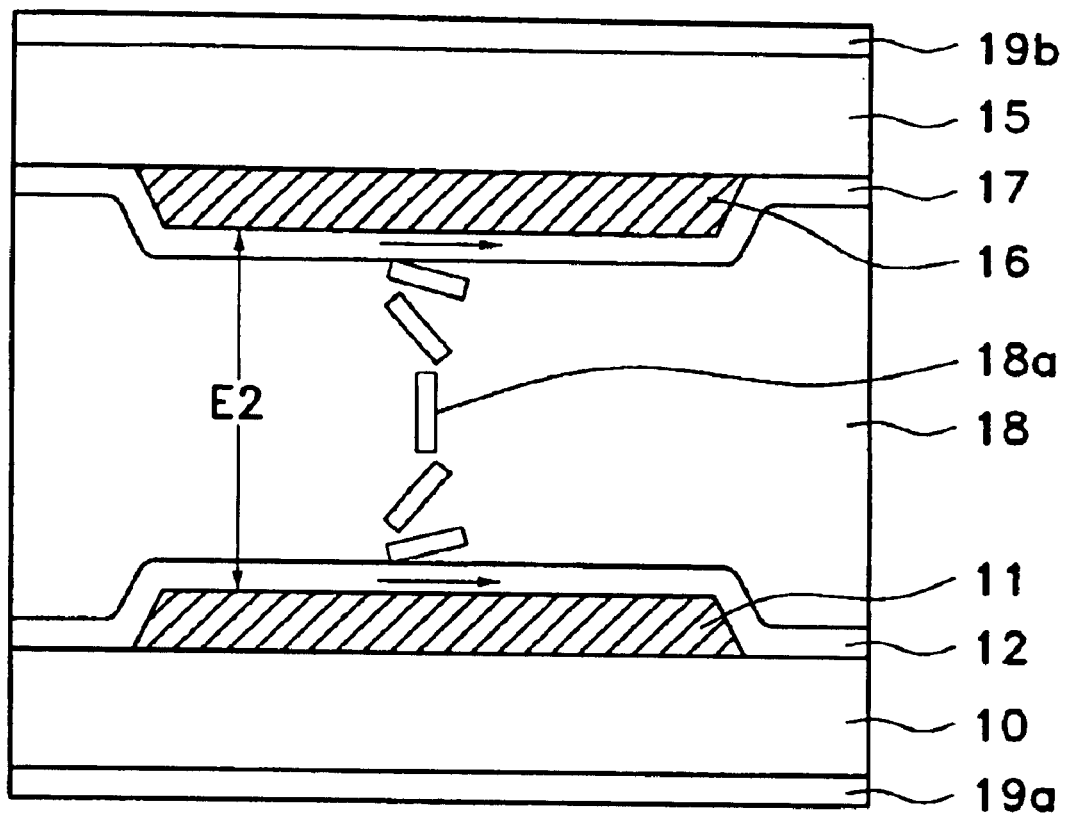

The objects and features of the invention may be understood with reference to the following detailed description of an illustrative embodiment of the invention, taken together with the accompanying drawings. The elements having the same functions will be described with the same reference numerals and repeated explanations will be omitted.

Figure 5:
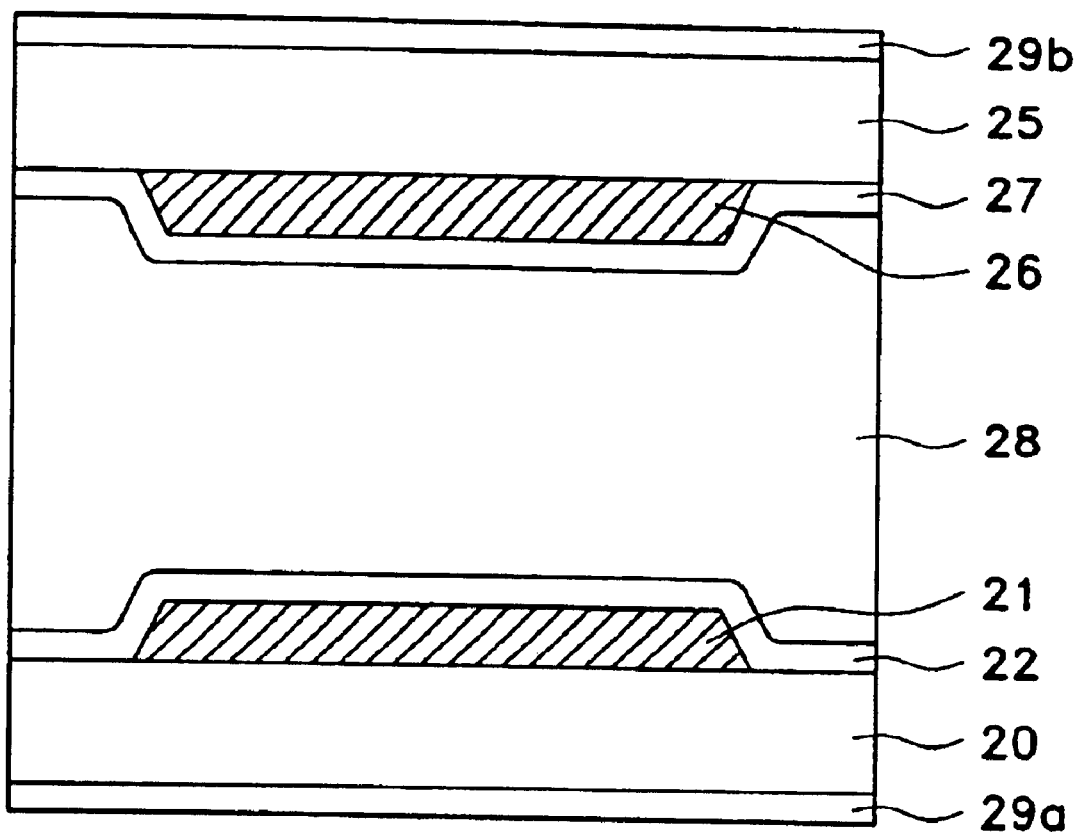
FIG. 5 is a cross sectional view showing a structure of COCB mode liquid crystal display device according to the present invention.

FIG. 5 is a drawing showing the structure of COCB mode liquid crystal display device according to the present invention.

Referring to FIG. 5, a lower substrate 20 and an upper substrate 25 are arranged opposite to each other with a predetermined distance. And, a liquid crystal layer 28 is interposed between the lower substrate 20 and the upper substrate 25, wherein the liquid crystal layer 28 includes liquid crystals having refractive anisotropy, made of materials with positive dielectric anisotropy. On the inner sides of the lower and upper substrates 20,25, driving electrodes 21,26 are arranged to drive liquid crystal molecules. A first alignment layer 22 is arranged on the inner surface of lower substrate 20, that is, between the lower substrate 20 and the liquid crystal layer 28, and a second alignment layer 27 is arranged on the inner surface of upper substrate 25, that is, between the upper substrate 25 and the liquid crystal layer 28. The first and the second alignment layers 22,27 are horizontal alignment layers having a pretilt angle of below 10°, rubbed in directions parallel with each other.

In the liquid crystal layer 28, the product of cell gap and refractive anisotropy is in the range of 0.5~2 μm to have a maximum transmittance at a predetermined voltage. The chiral dopants are added to the liquid crystal so that d/p is maintained in the range of 0.26~0.8. The chiral dopants are selected in order that stable twist can be obtained after voltage application although the liquid crystals are arranged in a twist or a mixture of twist and splay before voltage application.

Then, polarizing plates 29a,29b are attached to the outer sides of lower and upper substrates 20,25, transmittance axes thereof being perpendicular to each other and forming an angle of 4~50°, desirably 45°, with the rubbing direction.

The operation of liquid crystal display device will be described in more detail.

Figure 3:
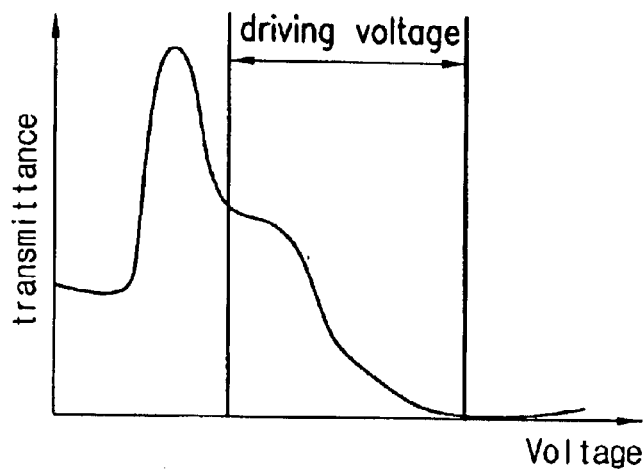
FIG. 3 is a waveform showing the transmittance and the driving voltage according to voltage application of conventional COCB mode liquid crystal display device.

FIG. 3 shows the transmittance according to voltage application. As shown in the drawing, stable twist is converted into band state by applying voltage. Therefore, there are no differences from conventional OCB mode when it comes to voltage over a predetermined value. When voltage is applied to a predetermined value, liquid crystals are arranged to the direction of electric field, thereby obtaining dark by polarizing plates vertically attached. Here, it is possible to control driving voltage and viewing angle by attaching phase compensation films between polarizing plates and upper and lower substrates, respectively.

In this case, transmittance may be changed since liquid crystals are arranged not desirably but temporarily out of driving voltage range. According to the conventional method, data signal is applied only once when a gate signal is applied to drive TFT. However, according to the present invention, predetermined voltage is applied between a prior signal and a desirable one, thereby preventing rapid change of liquid crystals. Therefore, transmittance is uniformly changed and it is possible to obtain rapid response time of OCB mode without losing response time.

Figure 6:
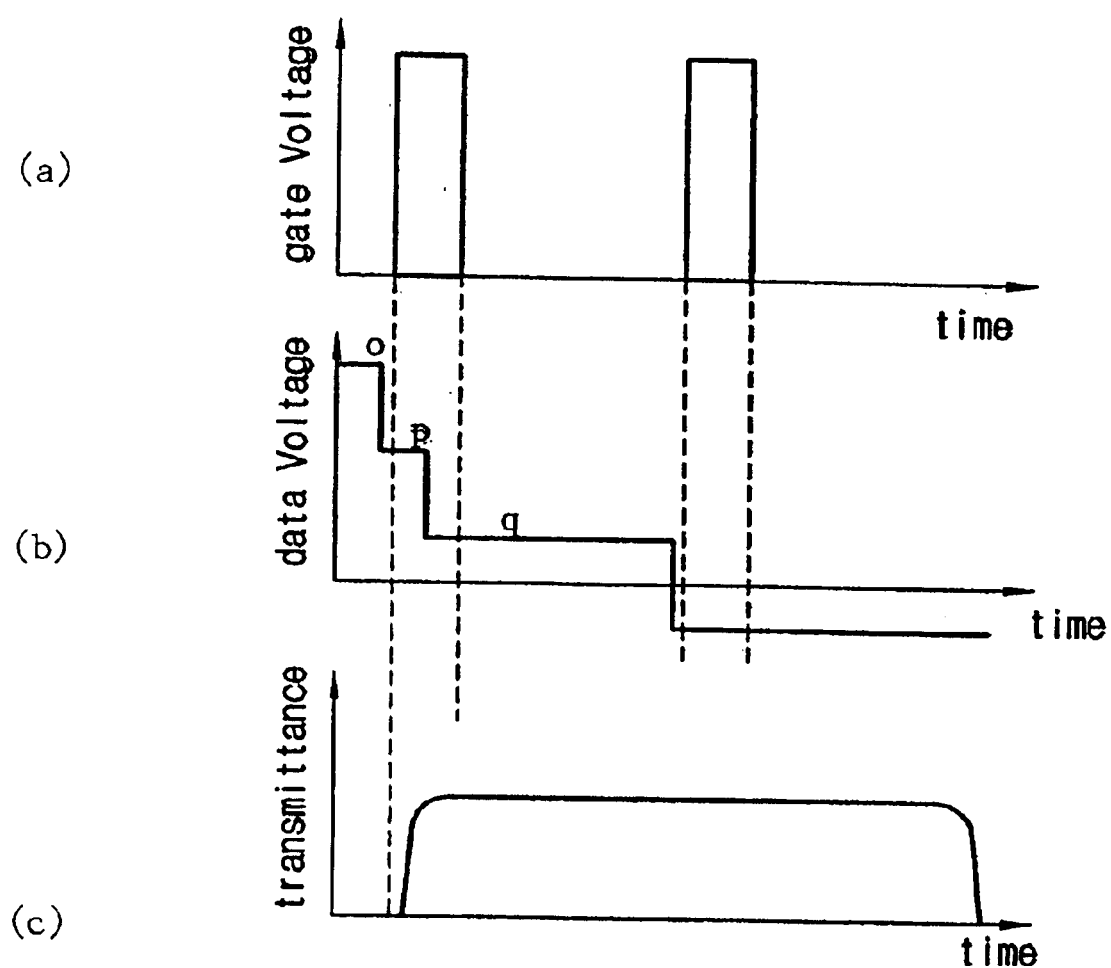
FIGS. 6A to 6C are waveforms showing the driving signal and transmittance when it is changed from dark to white in COCB mode according to the present invention.

FIG. 6 is drawing showing driving signals and transmittance when it is changed from dark to white in COCB mode of the present invention.

As shown in the drawings, when a gate signal is applied to drive TFT (FIG. 6(a)), a data signal is applied to have stairs type pulse signal (FIG. 6(b)). The stairs type pulse signal has voltage p between the data voltage o before applying gate voltage and the data voltage q after applying gate voltage. That is, the data signal has stairs type pulse signal having voltage between prior voltage and final voltage, thereby decreasing the rapid change of liquid crystals due to rapid potential differences.

Figure 4:
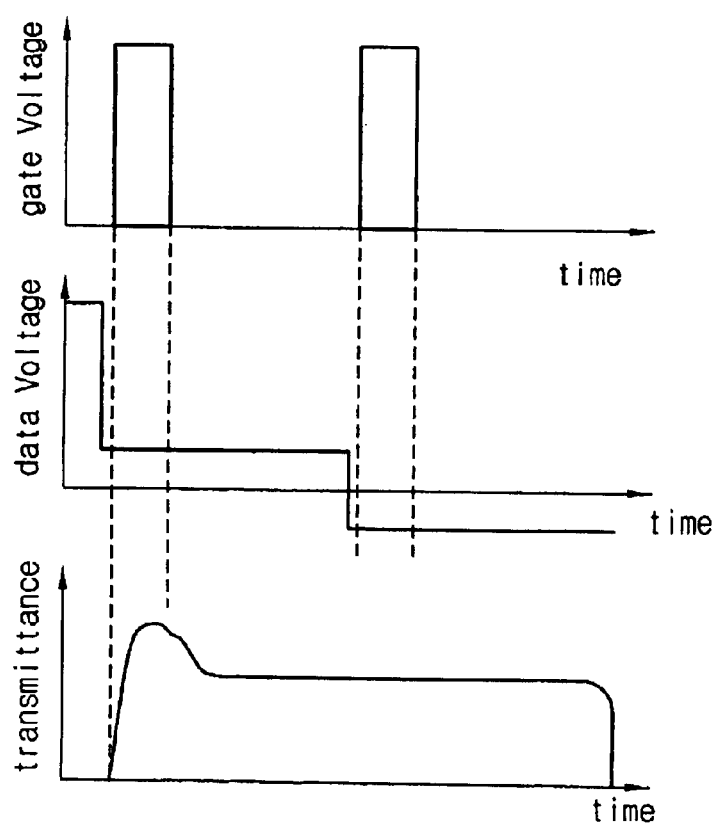
FIG. 4 is a waveform showing the driving and transmittance of conventional COCB mode.

As shown in FIG. 6(c), after applying data voltage, transmittance is changed to a desired level without delay. That is, there is no over twist of liquid crystals. (According to conventional method, as shown in FIG. 4, transmittance is changed to desirable level through another transmittance after applying data voltage having spherical pulse signal, thereby generating over twist of liquid crystals.)

Figure 7:
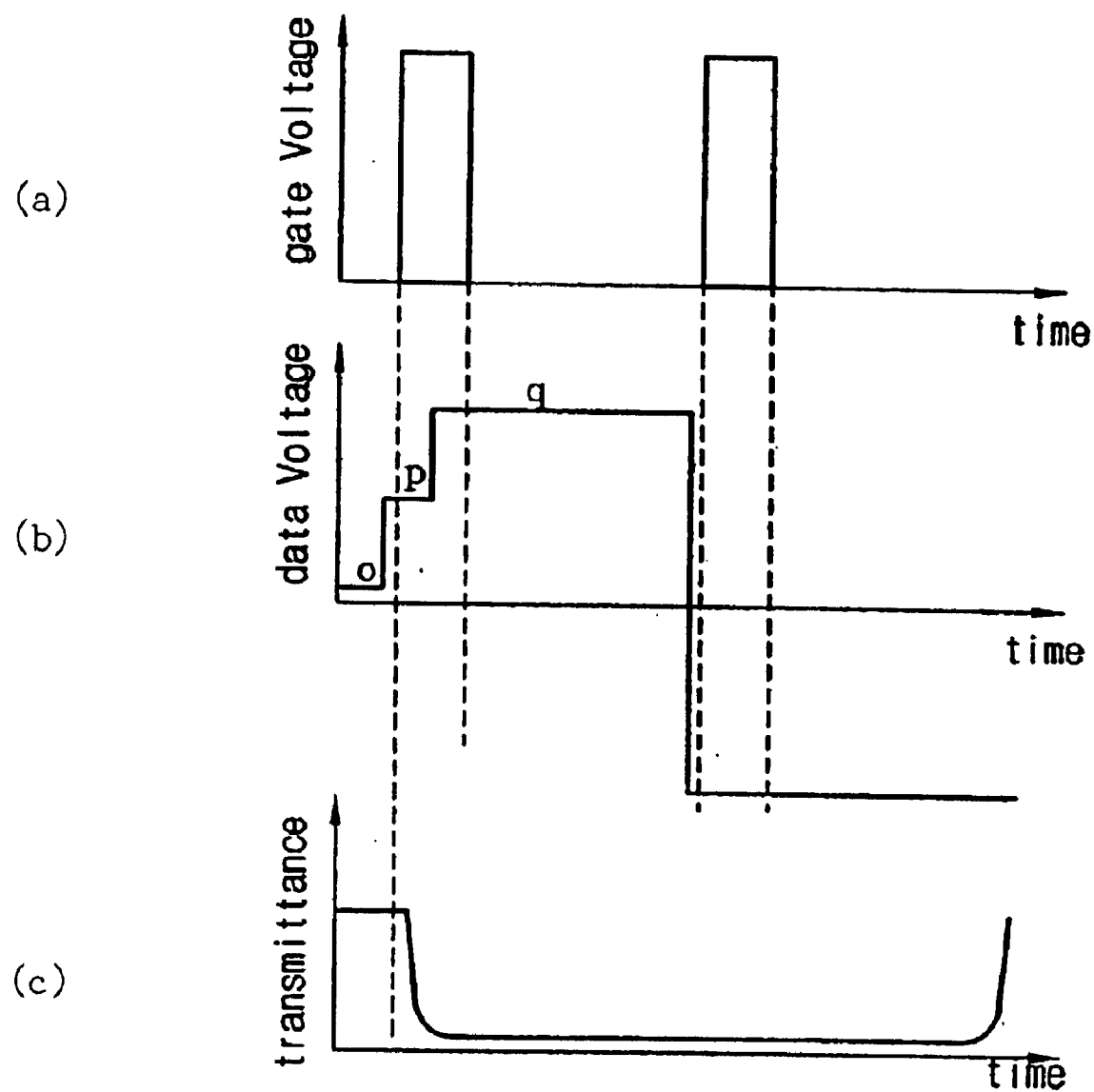
FIGS. 7A to 7C are waveform showing the driving signal and transmittance when it is changed from white to dark in COCB mode according to the present invention.

FIG. 7 is drawing showing the driving signals and transmittance when it is changed from white to dark in COCB mode of the present invention.

As shown in the drawings, when a gate signal is applied to drive TFT (FIG. (7(a)), a data signal is applied to have stairs type pulse signal (FIG. 7(b)). The stairs type pulse signal has voltage p between the data voltage o before applying gate voltage and the data voltage q after applying gate voltage. That is, the data signal has stairs type pulse signal having voltage between prior voltage and final voltage, thereby decreasing the rapid change of liquid crystals due to rapid potential differences.

As shown in FIG. 7(c), after applying data voltage, transmittance is changed to a desired level without delay. That is, there is no over twist of liquid crystals.

Figure 8:
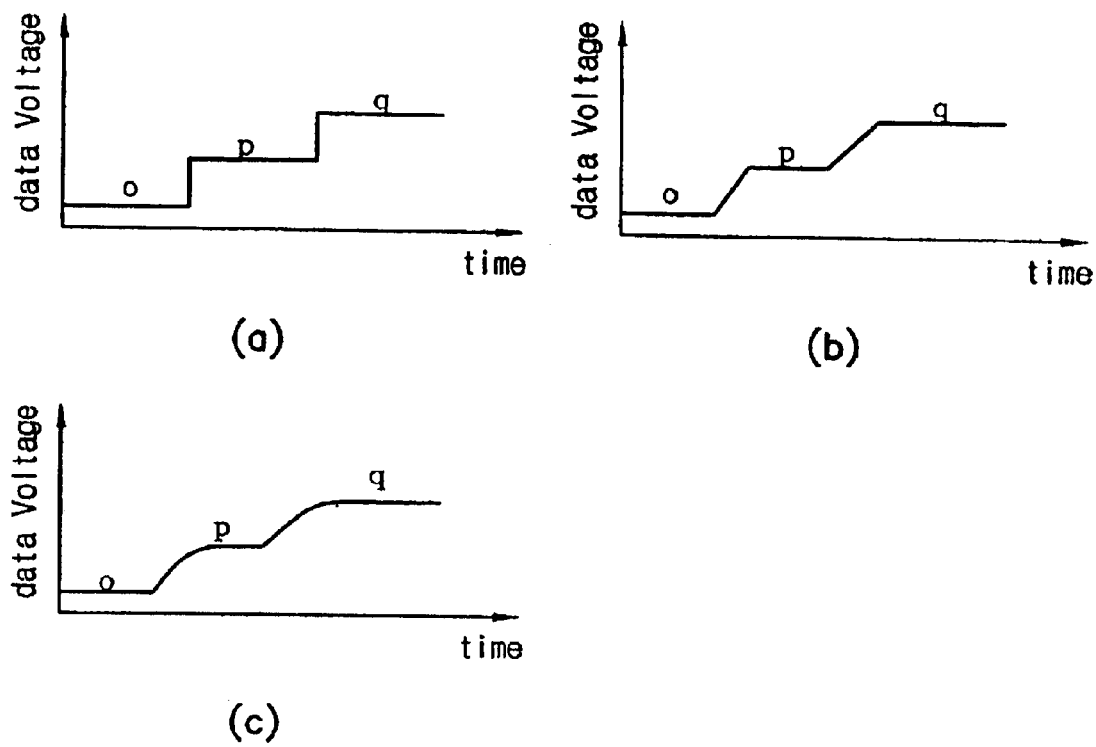
FIGS. 8A to 8C are waveforms of voltage applied to COCB mode data of the present invention.

FIG. 8 is waveform showing voltage applied to COCB mode data of the present invention.

As shown in the drawings, a data signal is a stairs type pulse signal having voltage p between data voltage o before applying gate voltage and data voltage q after applying gate voltage, wherein the shape and size can be controlled. And, it is also possible to change the data signals more than three times when the gate signal is applied.

As described above, the liquid crystal display device of the present invention can apply data signal with stairs type pulse signal when a gate signal is applied to drive TFT, thereby preventing over twist of liquid crystals and improving response time properties.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A COCB mode liquid crystal display device having a stairs step type driving signal comprising: an upper and a lower substrates arranged opposite to each other with a predetermined distance; a liquid crystal layer interposed between the upper/lower substrates, comprising liquid crystals having refractive anisotropy; a first and a second driving electrodes arranged on the inner sides of upper and lower substrates to drive the liquid crystal; a thin film transistor connected to one of said driving electrodes; a first alignment layer arranged between the lower substrate and the liquid crystal layer, rubbed to a first direction; a second alignment layer arranged between the upper substrate and the liquid crystal layer, rubbed in a direction parallel with the first alignment layer; a first polarizing plate disposed on the outer side of the lower substrate, forming an angle of 45° with the first direction; and a second polarizing plate disposed on the outer side of the upper substrate, the transmittance axis thereof being perpendicular to the first polarizing plate and forming an angle of 45° with the first direction and when a gate signal is applied to drive the thin film transistor in each pixel, data signals having two or more stairs type pulse signals are successively applied at immediately adjacent levels.

2. The COCB mode liquid crystal display device having stairs type driving signal according to claim 1, wherein dopants are added to the liquid crystal as much as cell gap (d)/pitch (p) is in a range of from about 0.1 to about 0.8, according to the cell gap, thereby maintaining 180° twisted state after twisted by voltage application although they are arranged in a splay or a mixture of splay and twist before applying voltage.

3. The COCB mode liquid crystal display device having stairs type driving signal according to claim 2, wherein the dip is in a range of from about 0.36 to about 0.8 so that the twist state can be stably maintained before applying voltage.

4. The COCB mode liquid crystal display device according to claim 3, wherein the refractive anisotropy of liquid crystal is $\Delta n=0.06$ to about 0.18, the cell gap is in a range from about 3 to about 20 $\mu$m and d$\Delta$n is 0.18 to about 3.6 $\mu$m.

5. The COCB mode liquid crystal display device having a stairs type driving signal according to claim 3, wherein the liquid crystals have dielectric anisotropy of $\Delta\epsilon=2$ to about 20 to lower driving voltage.

6. The COCB mode liquid crystal display device having stairs type driving signal according to claim 3, wherein the liquid crystals have a phase retardation of d$\Delta$n 0.02 to about 1.5 $\mu$min, relative to the front thereof and refractive anisotropy perpendicular or horizontal to the rubbing axis of the first direction, thereby becoming dark at a desired voltage.

7. The COCB mode liquid crystal display device having a stairs type driving signal according to claim 3, wherein the liquid crystal has a pretilt angle in the range of from 0 to about 40°.

8. The COCB mode liquid crystal display device having a stairs type driving signal according to claim 2, wherein the dopants added to the liquid crystal are in a range of from 0.26 to 0.36 according to the cell gap.

* * * * *